(12) United States Patent
Nowack et al.

(10) Patent No.: US 7,844,225 B2
(45) Date of Patent: Nov. 30, 2010

(54) RADIO FOR A MOTOR VEHICLE

(75) Inventors: Frank Nowack, Troisdorf (DE);
Stephan Volker, Lehrte (DE);
Klaus-Gert Besel, Sickte (DE)

(73) Assignee: Volkswagen AG, Wolfsburg (DE)

( * ) Notice: Subject to any disclaimer, the term of this patent is extended or adjusted under 35 U.S.C. 154(b) by 633 days.

(21) Appl. No.: 11/629,971

(22) PCT Filed: Jun. 8, 2005

(86) PCT No.: PCT/EP2005/006123

§ 371 (c)(1),
(2), (4) Date: Jan. 7, 2008

(87) PCT Pub. No.: WO2005/125023

PCT Pub. Date: Dec. 29, 2005

(65) Prior Publication Data

US 2008/0242259 A1  Oct. 2, 2008

(30) Foreign Application Priority Data

Jun. 17, 2004  (DE) .................. 10 2004 029 334

(51) Int. Cl.
*H04B 7/00* (2006.01)
*H04K 3/00* (2006.01)

(52) U.S. Cl. .................. 455/66.1; 455/90.3; 455/347; 455/349

(58) Field of Classification Search .............. 455/66.1, 455/90.3, 344–349
See application file for complete search history.

(56) References Cited

U.S. PATENT DOCUMENTS

| 5,584,051 A | 12/1996 | Goeken |
| 6,130,727 A | 10/2000 | Toyozumi |
| 6,148,008 A * | 11/2000 | Okamoto .................. 370/486 |

FOREIGN PATENT DOCUMENTS

| DE | 41 36 068 | 5/1993 |
| EP | 0 905 931 | 3/1999 |
| EP | 0 925 989 | 6/1999 |
| EP | 1 022 873 | 7/2000 |
| JP | 11-234154 | * 8/1999 |

OTHER PUBLICATIONS

International Search Report, PCT International Patent Application No. PCT/EP2005/006123, dated Sep. 21, 2005.
Written Opinion of the International Searching Authority, PCT International Patent Application No. PCT/EP2005/006123, dated Sep. 21, 2005 (translation provided).

* cited by examiner

*Primary Examiner*—Lee Nguyen
(74) *Attorney, Agent, or Firm*—Kenyon & Kenyon LLP

(57) ABSTRACT

A radio for a motor vehicle includes a housing in which a radio module and a digital radio decoder are arranged. The radio module includes a radio-module low-frequency input and a radio-module low-frequency output for the emission of a low-frequency signal which is inputted via the radio-module low-frequency input. The digital radio decoder includes a decoder high-frequency input, a decoder high-frequency output which is connected to the radio-module low-frequency input and a digital radio receiver for converting a digital radio signal inputted into the decoder high-frequency input into a low-frequency signal and for emitting the low-frequency signal via the decoder low-frequency output.

25 Claims, 4 Drawing Sheets

RADIO FOR A MOTOR VEHICLE

FIELD OF THE INVENTION

The present invention relates to a radio for a motor vehicle having a digital radio decoder.

BACKGROUND INFORMATION

It is conventional to install radios having an AM/FM receiver and a digital radio decoder into motor vehicles.

SUMMARY

Example embodiments of the present invention may lower the costs for motor vehicles having such radios, e.g., the cost for motor vehicles having a digital radio decoder.

According to example embodiments of the present invention, a radio for a motor vehicle include a housing in which a radio module and a digital radio decoder are situated; the radio module has a radio module low frequency input and a radio module low frequency output for outputting a low frequency signal arriving in the radio module low frequency input, and the digital radio decoder has a decoder high frequency input, a decoder low frequency output connected to the radio module low frequency input, and a digital radio receiver to convert a digital radio signal arriving via the decoder high frequency input, into a low frequency signal and to output the low frequency signal via the decoder low frequency output. Such a digital radio decoder may be, for instance, a DAB decoder, an SDARS decoder, a DVB-T decoder, etc. The radio may be configured such that a digital radio decoder of one standard may be exchanged for a digital radio decoder of another standard, and/or a digital radio decoder of one standard is able to be installed as an alternative to a digital radio decoder of another standard. For example, it may be provided that a DAB decoder, for instance, is exchanged for an SDARS decoder and/or a DAB decoder may be installed as an alternative to an SDARS decoder.

The radio module may include at least one radio module high frequency input. The radio module may include an FM receiver to receive an FM signal, and/or an AM receiver to receive an AM signal via the at least one radio module high frequency input, and to output a low frequency signal via the radio module low frequency output.

The radio module low frequency input and the decoder low frequency output may be directly connected to one another. The decoder low frequency output and the radio module low frequency input may form a plug connection. The decoder low frequency output and the radio module low frequency input or their electrical contacts may be soldered to each other.

The decoder may be inserted into the housing.

The radio module may have a radio module energy supply output adapted to a decoder energy supply input of the decoder. The radio module may have a radio module energy supply output connected to a decoder energy supply input of the decoder, the decoder energy supply input and the radio module energy output, e.g., forming a plug connection. The decoder energy supply input and the radio module energy supply output or their electrical contacts may be soldered to each other.

The radio module may have a radio module control signal interface connected to a decoder control signal interface of the decoder, the decoder control signal interface and the radio module control signal interface, e.g., forming a plug connection. The decoder control signal interface and the radio module control signal interface or their electrical contacts may be soldered to each other.

The radio module may have an interface with a CD drive, an interface with a telephone module and/or an interface with a TV tuner, etc.

The radio module may be implemented as mounting plate, the radio module low frequency input, the radio module energy supply output and/or the radio module control signal interface, e.g., being implemented as plug connectors on the mounting board.

Example embodiments of the present invention provide a method for producing a radio for a motor vehicle, a radio module being situated in a housing, the radio module having a radio module low frequency input and a radio module low frequency output to output a low frequency signal arriving in the radio module low frequency input; and a digital radio decoder, which has a decoder high frequency input, a decoder low frequency output and a digital radio receiver to convert a digital radio signal arriving via the decoder high frequency input into a low frequency signal and to output the low frequency signal via the decoder low frequency output, is situated in or inserted into the housing such that the decoder low frequency output is connected to the radio module low frequency input.

The decoder low frequency output may be plugged together with the radio module low frequency input.

Example embodiments of the present invention provide a method for producing a radio for a motor vehicle, a radio module having a radio module low frequency input and a radio module low frequency output to output a low frequency signal arriving in the radio module low frequency input, a radio module energy supply output, and a radio module control signal interface being situated in a housing; and a digital radio decoder, which has a decoder high frequency input, a decoder low frequency output, a decoder energy supply input, a decoder control signal interface, and a digital radio receiver to convert a digital radio signal arriving via the decoder high frequency input into a low frequency signal and to output the low frequency signal via the decoder low frequency output, being situated in the housing or inserted into the housing such that the decoder low frequency output is connected to the radio module low frequency input, the decoder energy supply input is connected to the radio module energy supply output and/or the decoder control signal interface is connected to the radio module control signal interface.

A low frequency signal may include, e.g., an audio signal, i.e., a signal in an audible frequency range. A low frequency signal may include, e.g., a signal for controlling a loudspeaker, i.e., a signal directly convertible into an acoustic signal by a diaphragm or similar element.

A high frequency signal may be, for example, an FM signal or an AM signal. A high frequency signal also may be, for example, a signal from a digital radio transmitter. A high frequency signal may be a signal in the MHz range and/or the GHz range.

A motor vehicle may include a land vehicle that may be used individually in road traffic. Motor vehicles are not restricted to land vehicles having an internal combustion engine.

Further aspects and details of exemplary embodiments of the present invention are described in more detail below with reference to the appended Figures.

DETAILED DESCRIPTION

Figure 1:
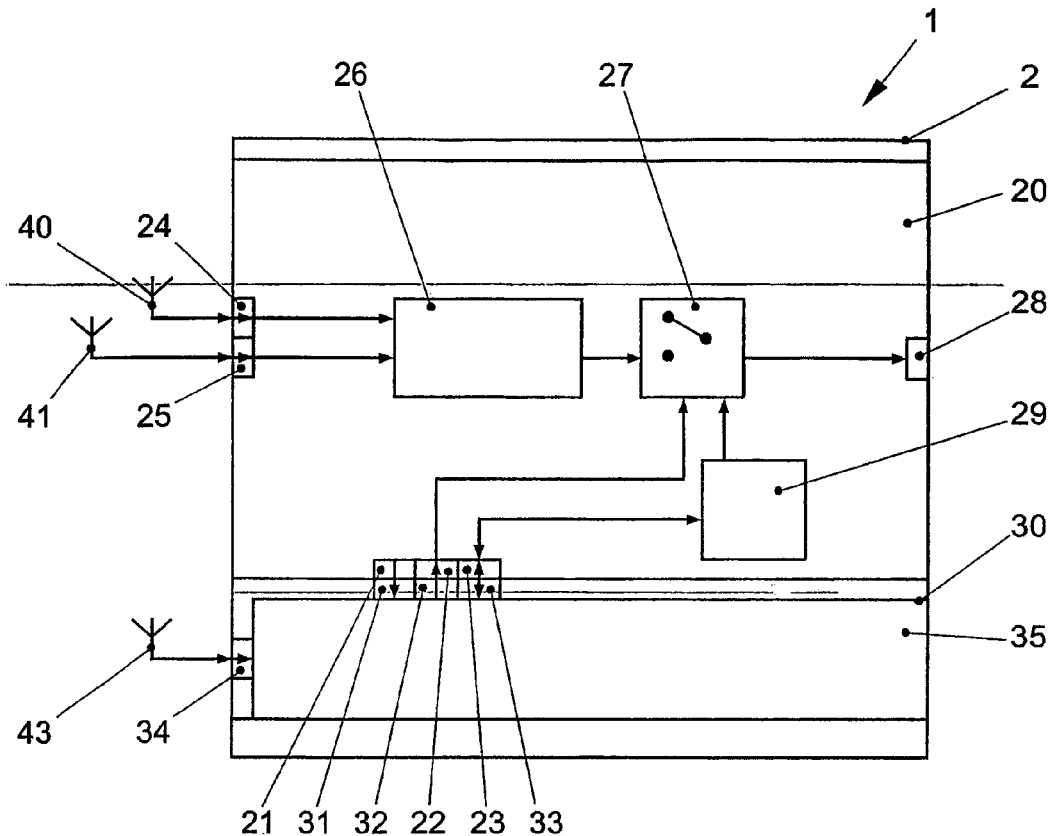
FIG. 1 illustrates an exemplary embodiment of a radio.

FIG. 1 schematically illustrates an exemplary embodiment of a radio 1 for a motor vehicle. Radio 1 includes a housing 2 in which a radio module 20 and a digital radio decoder 30 (able to be inserted or plugged into housing 2, for instance) are disposed. Such a digital radio decoder 30 may be, for instance, a DAB decoder, an SDARS decoder, a DVB-T decoder, etc.

Radio module 20 has a radio module low frequency input 22 and a radio module low frequency output 28 to output a low frequency signal arriving in radio module low frequency input 22. Radio module 20 includes two radio module high frequency inputs 24 and 25, which are connectable to antennas 40 and 41, respectively, as well as an AM/FM receiver 26 to receive an AM signal or an FM signal with the aid of radio module high frequency inputs 24 and 25, and to output a (demodulated) low frequency signal via radio module low frequency output 28. Between radio module low frequency input 22 and radio module low frequency output 28, or between AM/FM receiver 26 and radio module low frequency output 28, radio module 20 is provided with a switching module 27, which is controllable via a control module 29, for the optional outputting of a low frequency signal arriving in radio module low frequency input 22, or a low frequency signal able to be output by AM/FM receiver 26. Control module 29 is operable with the aid of an operating element, which, for instance, may be connected to housing 2 or may be disposed separately therefrom.

Digital radio decoder 30 has a decoder high frequency input 34, which is connectable to an antenna 43, a decoder low frequency output 32 connected to radio module low frequency input 22, and a digital radio receiver 35 to convert a digital radio signal arriving via decoder high frequency input 34 into a (decoded/demodulated) low frequency signal and to output the low frequency signal via decoder low frequency output 32.

Radio 1 is configured such that a digital radio decoder of one standard is exchangeable for a digital radio decoder of another standard and/or a digital radio decoder of one standard is able to be installed as an alternative to a digital radio decoder of another standard. For example, it may be provided that a DAB decoder, for instance, is able to be exchanged for an SDARS decoder, and/or a DAB decoder may be installed as an alternative to an SDARS decoder.

Digital radio decoder 30 has a decoder energy supply input 31. Radio module 20 includes a radio module energy supply output 21 adapted to decoder energy supply input 31 of digital radio decoder 30 and connected to decoder energy supply input 31. Furthermore, digital radio decoder 30 includes a decoder control signal interface 33, and radio module 20 includes a radio module control signal interface 23 connected to decoder control signal interface 33 of digital radio decoder 30. Control signals between digital radio decoder 30 and radio module 20 may be exchanged via the connection of decoder control signal interface 33 and radio module control signal interface 23.

Radio module low frequency input 22 and decoder low frequency output 32, radio module energy supply output 21 and decoder energy supply input 31 as well as radio module control signal interface 23 and decoder control signal interface 33 are connected to each other via plugs and/or soldered to each other.

Figure 2:
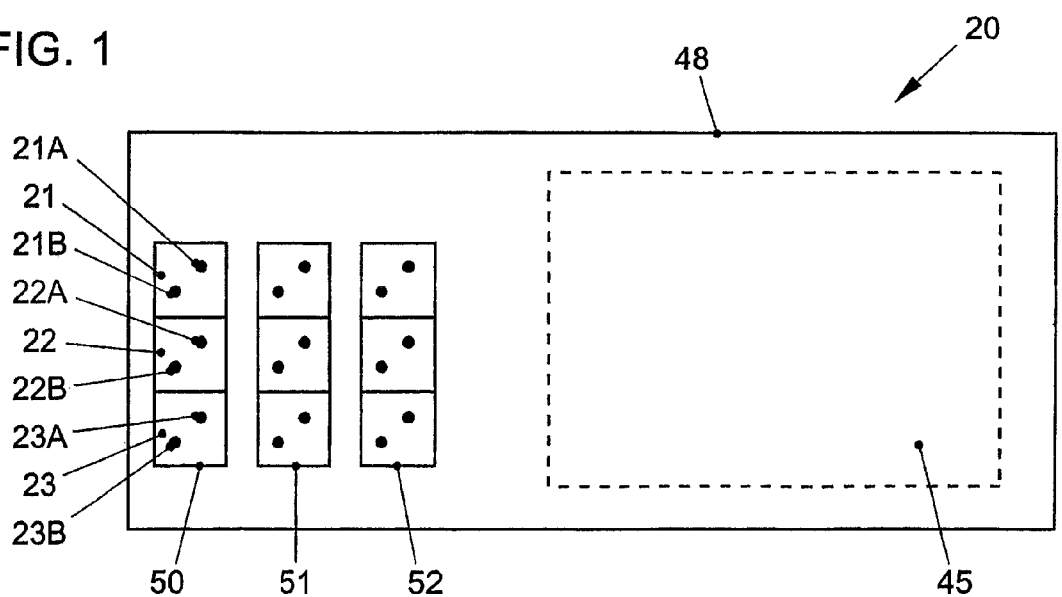
FIG. 2 illustrates an exemplary embodiment of a radio module.

FIG. 2 schematically illustrates an example embodiment of radio module 20. Radio module 20 is implemented on a mounting plate 48, reference numeral 45 denoting a region on mounting plate 48 in which, for instance, elements such as AM/FM receiver 26 and possibly a DRM decoder and/or an IBOC decoder are situated. Furthermore, plugs 50, 51 and 52 are disposed on mounting plate 48 as well, their plug direction being aligned orthogonally with respect to mounting board 48.

Plug 50 includes radio module low frequency input 22, radio module energy supply output 21, and radio module control signal interface 23. Radio module low frequency input 22 has two electrical contacts 22A and 22B; radio module energy supply output 21 has two electrical contacts 21A and 21B; and radio module control signal interface 23 has two electrical contacts 23A and 23B.

Figure 3:
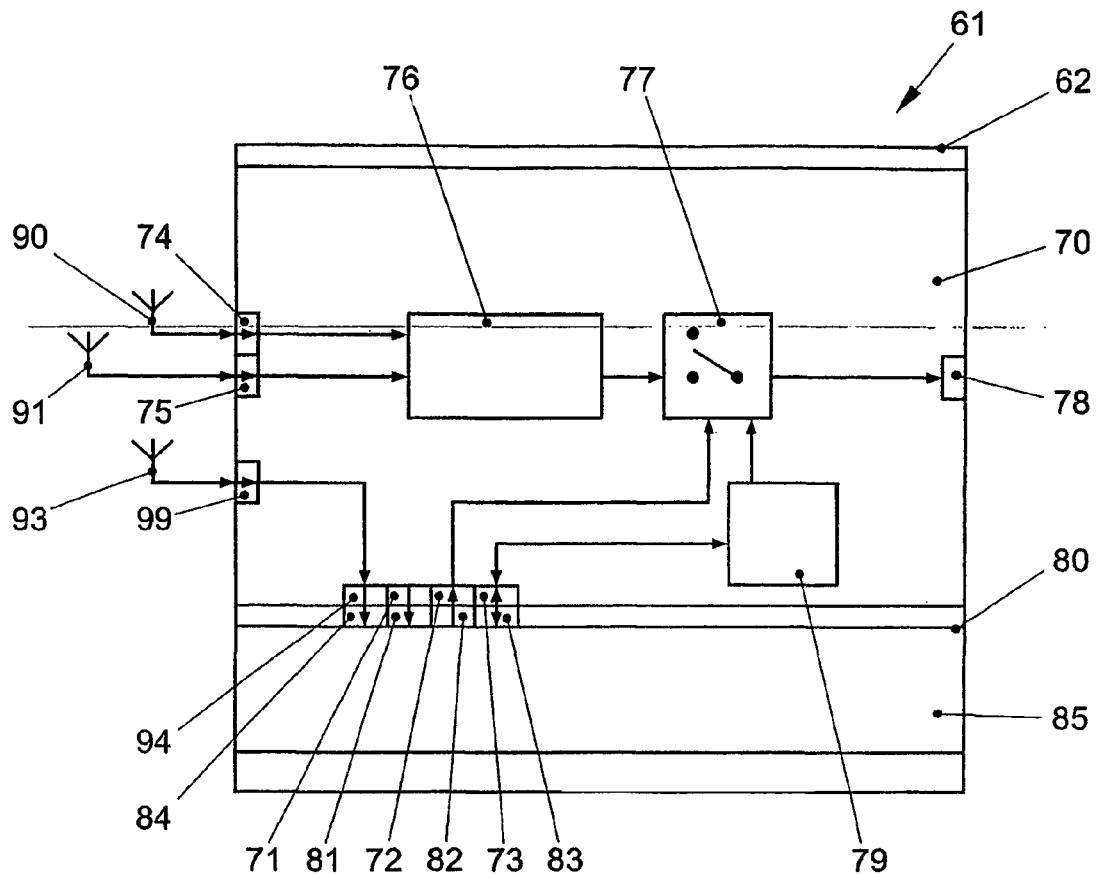
FIG. 3 illustrates an exemplary embodiment of a radio.

Plugs 51 and 52 are designed analogously to plug 50. With the aid of plug 51, mounting plate 48 is able to be connected to, for example, a memory card reading device, and with the aid of plug 52, it is able to be connected to a CD and/or DVD drive. FIG. 3 schematically illustrates an exemplary embodiment of a radio 61 for a motor vehicle. Radio 61 includes a housing 62 in which a radio module 70 and a digital radio decoder 80 (able to be inserted or plugged into housing 62, for instance) are disposed. Such a digital radio decoder may be, for instance, a DAB decoder, an SDARS decoder, a DVB-T decoder, etc.

Radio module 70 has a radio module low frequency input 72 and a radio module low frequency output 78 to output a low frequency signal arriving in radio module low frequency input 72. Radio module 70 also includes a radio module high frequency input 99, which is connectable to an antenna 93, and a radio module high frequency output 94 to output a high frequency signal arriving in radio module high frequency input 99. Furthermore, radio module 70 includes two radio module high frequency inputs 74 and 75, which are connectable to antennas 90 and 91, respectively, as well as an AM/FM receiver 76 to receive an AM signal or an FM signal with the aid of radio module high frequency inputs 74 and 75, and to output a (demodulated) low frequency signal via radio module low frequency output 78. Between radio module low frequency input 72 and radio module low frequency output 78, or between AM/FM receiver 76 and radio module low frequency output 78, radio module 70 is provided with a switching module 77, which is controllable with the aid of a control module 79, for the optional outputting of a low frequency signal arriving in radio module low frequency input 72, or a low frequency signal able to be output by AM/FM receiver 76. Control module 79 is operable with the aid of an operating element, which, for instance, may be connected to housing 62 or may be located separately therefrom.

Digital radio decoder 80 includes a decoder high frequency input 84 connected to radio module high frequency output 94; a decoder low frequency output 82 connected to radio module low frequency input 72; and a digital radio receiver 85 to convert a digital radio signal arriving via decoder high frequency input 84 into a (decoded/demodulated) low frequency signal and to output the low frequency signal via decoder low frequency output 82.

Radio 61 is configured such that a digital radio decoder of one standard may be exchanged for a digital radio decoder of another standard and/or a digital radio decoder of one standard may be installed as an alternative to a digital radio decoder of another standard. For example, it may be provided that a DAB decoder, for instance, is exchangeable for an SDARS decoder and/or a DAB decoder may be installed as an alternative to an SDARS decoder.

Digital radio decoder 80 has a decoder energy supply input 81. Radio module 70 includes a radio module energy supply output 71, which is adapted to decoder energy supply input 81 of digital radio decoder 80 and connected to decoder energy supply input 81. Furthermore, digital radio decoder 80 includes a decoder control signal interface 83, and the radio module includes a radio module control signal interface 73 connected to decoder control signal interface 83 of digital radio decoder 80. Control signals between digital radio decoder 80 and radio module 70 may be exchanged via the connection of decoder control signal interface 83 and radio module control signal interface 73.

Radio module low frequency input 72 and decoder low frequency output 82, radio module energy supply output 71 and decoder energy supply input 81, radio module control signal interface 73 and decoder control signal interface 83 as well as radio module high frequency output 94 and decoder high frequency input 84 are connected to each other via plugs and/or soldered to each other.

Figure 4:
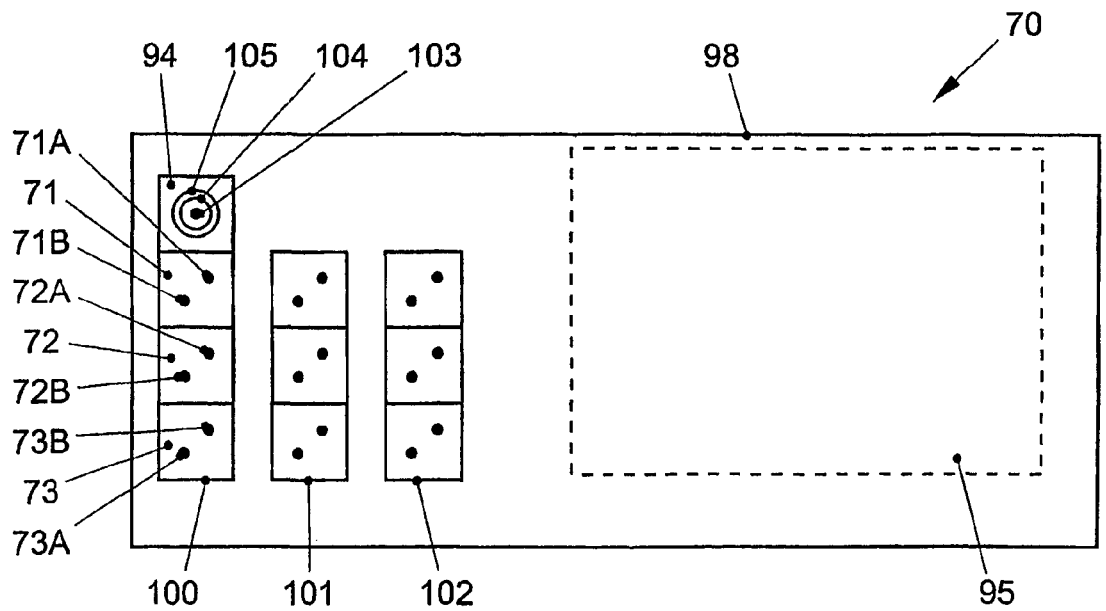
FIG. 4 illustrates an exemplary embodiment of a radio module.

FIG. 4 schematically illustrates a radio module 70. Radio module 70 is implemented on a mounting plate 98, reference numerals 95 denoting a region on mounting plate 98 in which, for instance, elements such as AM/FM receiver 76 and possibly a DRM decoder and/or an IBOC decoder are positioned. Furthermore, plugs 100, 101 and 102 are disposed on mounting plate 98 as well, their plug direction being aligned orthogonally with respect to mounting plate 98.

Plug 100 includes radio module low frequency input 72, radio module energy supply output 71, radio module control signal interface 73, and radio module high frequency output 94. Radio module low frequency input 72 has two electrical contacts 72A and 72B; radio module energy supply output 71 has two electrical contacts 71A and 71B; and radio module control signal interface 73 has two electrical contacts 73A and 73B. Radio module high frequency output 94 has two electrical contacts 103 and 104, which are disposed coaxially within a shield 105.

Plugs 101 and 102 are designed analogously to plug 100, but do not have radio module high frequency output 94. With the aid of plug 101, mounting plate 98 is able to be connected to, for example, a memory card reading device, and with the aid of plug 102, it is able to be connected to a CD and/or DVD drive.

Figure 5:
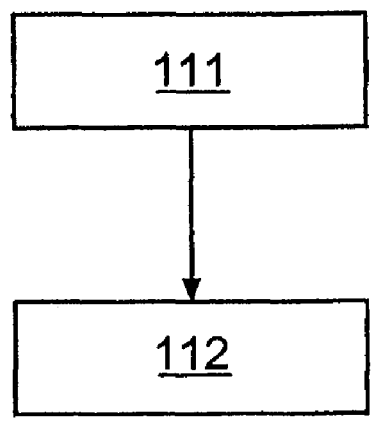
FIG. 5 illustrates a method for producing a radio for a motor vehicle.

FIG. 5 illustrates a method for producing radio 1 or 61. In this context, radio module 20 or 70 is placed inside housing 2 or 62 in a step 111. Step 111 is followed by a step 112 in which digital radio decoder 30 or 80 is placed inside housing 2 or 62, or plugged or inserted into housing 2 or 62 such that decoder low frequency output 32 is connected to radio module low frequency input 22, decoder energy supply input 31 is connected to radio module energy supply output 21, and decoder control signal interface 33 is connected to radio module control signal interface 23 within the context of a plug connection, or that decoder low frequency output 82 is connected to radio module low frequency input 72, decoder energy supply input 81 is connected to radio module energy supply output 71, decoder control signal interface 83 is connected to radio module control signal interface 73, and decoder high frequency input 84 is connected to radio module high frequency output 94 within the context of a plug connection.

Figure 6:
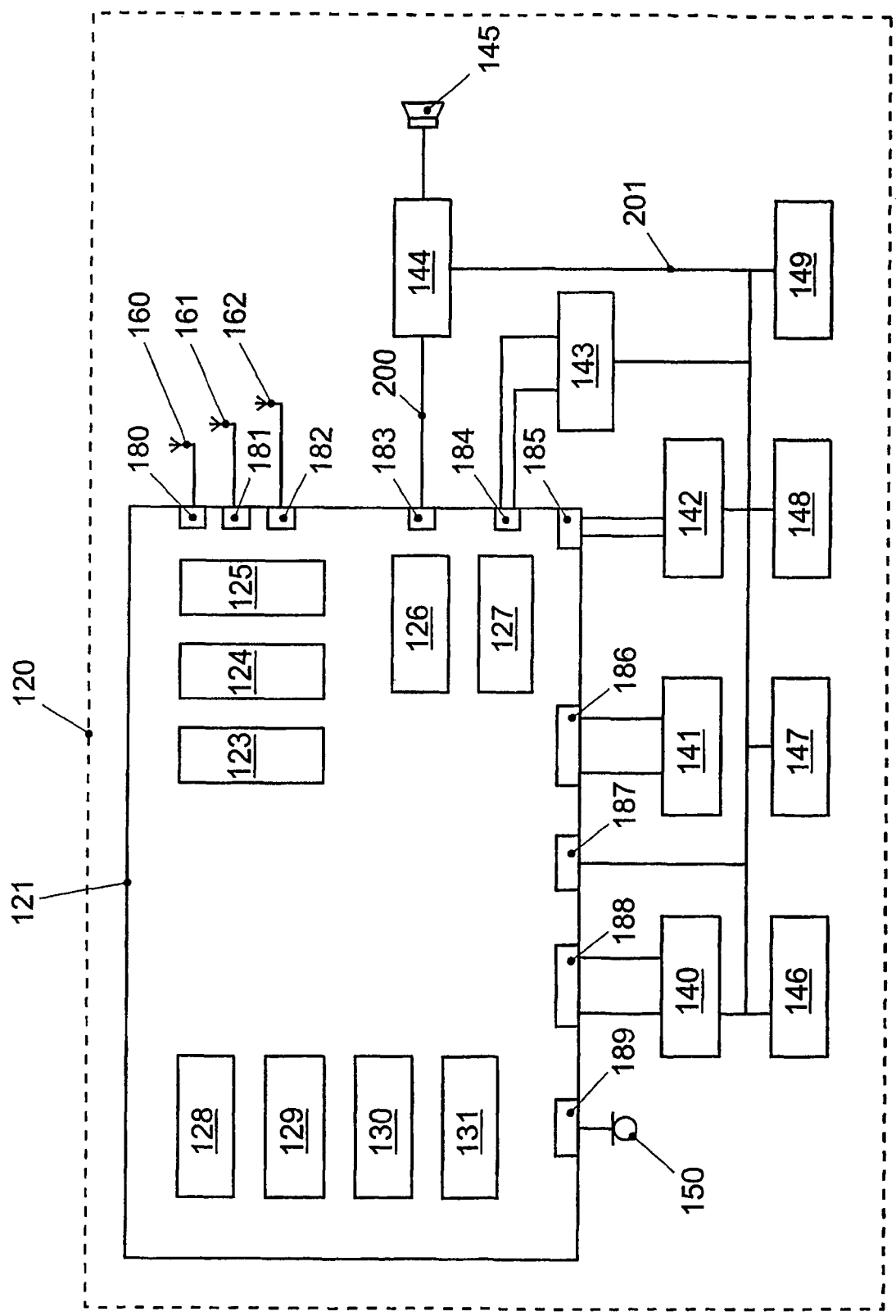
FIG. 6 illustrates an exemplary embodiment of a radio.

FIG. 6 schematically illustrates a motor vehicle 120 having a schematically illustrated radio 121. Radio 121 includes a digital radio decoder 123 plugged into a plug corresponding to plug 50 or 100, a memory card reading device 124 plugged into a plug corresponding to plug 51 or 101, and a CD and/or DVD drive 125 (or CD changer) plugged into a plug corresponding to plug 52 or 102. Digital radio decoder 123 is connected to an antenna 160 with the aid of a high frequency input 180 of radio 121. In addition, radio 121 includes an AM/FM receiver 126 (having a DRM decoder and/or an IBOC decoder, as the case may be), which is connected to antennas 161 and 162 with the aid of high frequency inputs 181 and 182, respectively, of radio 121. Low frequency signals able to be generated by digital radio decoder 123, memory card reading device 124, plugged-in CD and/or DVD drive 125, and AM/FM receiver 126, are amplified and filtered with the aid of an output stage 127, and may be output to a low frequency line 200 or a loudspeaker 145 via a low frequency output 183. An external amplifier 144 may be provided as volume control, for instance, between low frequency output 183 and loudspeaker 145. Furthermore, radio 121 includes a memory 128 having a man-machine interface stored as program code, a man-machine interface for operating radio 121 being displayed with the aid of the program code on an instrument cluster 146 connected to radio 121 via a CAN bus 201. Radio 121 has a CAN bus interface 187 correspondingly connected to CAN bus 201 for this purpose. As an alternative or in addition, further displays or separate operating elements may also be connected to radio 121 in the form of a data link, via CAN bus 201.

In addition, radio 121 may include a diagnosis system 129, a voice-controlled operating system 130 and/or components 131 for a navigation system. Furthermore, radio 121 includes a low frequency input 189 connected to a microphone 150, and a telephone interface 188, which is connected to a telephone module 140 and includes a low frequency input, a low frequency output and a telephone control signal interface. Radio 121 also includes a CD-changer interface 186, which is connected to a CD changer 141 and has a low frequency input and a CD changer control signal interface; optionally a TV interface 185, which is connectable to a TV tuner 142 and includes a low frequency input and a video input; and, also optionally, a rear seat entertainment interface 184, which is connectable to a rear seat entertainment system 143 and includes a low frequency output and a video output. Alternatively, CD changer 141 also may have a data link to radio 121 via CAN bus 201.

In addition, motor vehicle 120 includes a device 147 to supply vehicle signals such as the velocity of motor vehicle 120 or a key position (clamping status), a diagnosis tester 148, and a multi-function steering wheel 149. Telephone module 140, TV tuner 142, rear seat entertainment system 143, external amplifier 144, instrument cluster 146, device 147 for providing vehicle signals, diagnosis tester 148, and multi-function steering wheel 149 are interconnected to form a data link with the aid of CAN bus 201.

In FIG. 2 and FIG. 4, radio module energy supply output 21 or 71, radio module low frequency input 22 or 72, radio module control signal interface 23 or 73, decoder energy supply input 31 or 81, decoder low frequency output 32 or 82, decoder control signal interface 23 or 73, as well as low frequency inputs and outputs, energy supply inputs and outputs, and control signal interfaces of plugs 50, 51, 52, 100, 101, 102, are illustrated merely by two electrical contacts 21A, 21B, 22A, 22B, 23A, 23B, 71A, 71B, 72A, 72B, 73A or 73B for clarity. However, the low frequency inputs and outputs, the energy supply inputs and outputs, and the control signal interfaces may also include more than two electrical contacts in each case. For instance, each of the low frequency inputs and outputs may include four electrical contacts. The energy supply inputs and outputs may include, for instance, six or eight electrical contacts in each case, two electrical contacts in each case being assigned to one voltage potential. For example, two electrical contacts 3V, two electrical contacts 3.5V, and two electrical contacts 12V may be assigned. Each of the control signal interfaces may include, for example, four, eight or sixteen electrical contacts.

The elements, interfaces and contacts in the figures are illustrated with simplicity and clarity in mind and not necessarily to exact scale. For example, the orders of magnitude of certain elements, interfaces or contacts are depicted with exaggeration as compared with other elements or interfaces or contacts, in order to improve understanding.

| LIST OF REFERENCE CHARACTERS | |
|---|---|
| 1, 61 | radio |
| 2, 62 | housing |
| 20, 70 | radio module |
| 21, 71 | radio module energy supply output |
| 21A, 21B, 22A | |
| 22B, 23A, 23A | |
| 71A, 71B, 72A | |
| 72B, 73A, 73B | |
| 103, 104 | electrical contact |
| 22, 72 | radio module low frequency input |
| 23, 73 | radio module control signal interface |
| 24, 25, 74, 75 | radio module high frequency input |
| 26, 76 | AM/FM receiver |
| 27, 77 | switching module |
| 28, 78 | radio module low frequency output |
| 29, 79 | control module |
| 30, 80 | digital radio decoder |
| 31, 81 | decoder energy supply input |
| 32, 82 | decoder low frequency output |
| 33, 83 | decoder control signal interface |
| 34, 84 | decoder high frequency input |
| 35, 85 | digital radio receiver |
| 40, 41, 43, 90, 91, 93 | antenna |
| 45, 95 | region |
| 48, 98 | mounting plate |
| 50, 51, 52, 100, 101, 102 | plug |
| 94 | radio module high frequency output |
| 99 | radio module high frequency input |
| 105 | shield |
| 111, 112 | step |
| 120 | motor vehicle |
| 121 | radio |
| 123 | digital radio decoder |
| 124 | memory card reading device |
| 125 | CD and/or DVD drive |
| 126 | AM/FM receiver |
| 127 | output stage |
| 128 | memory |
| 129 | diagnosis system |
| 130 | voice-controlled operating system |
| 131 | components for a navigation system |
| 140 | telephone module |
| 141 | TV tuner |
| 142 | CD changer |
| 143 | rear seat entertainment system |
| 144 | external amplifier |
| 145 | loudspeaker |
| 146 | instrument cluster |
| 147 | device for supplying vehicle signals |
| 148 | diagnosis tester |
| 149 | multi-function steering wheel |
| 150 | microphone |
| 160, 161, 162 | antenna |
| 180, 181, 182 | high frequency input |
| 183 | low frequency output |
| 184 | rear seat entertainment interface |
| 185 | TV interface |
| 186 | CD changer interface |
| 187 | CAN bus interface |
| 188 | telephone interface |

-continued

| LIST OF REFERENCE CHARACTERS | |
|---|---|
| 189 | low frequency input |
| 200 | low frequency line |
| 201 | CAN bus |

What is claimed is:

1. A radio for a motor vehicle, comprising:
a radio module including a radio module low-frequency input and a radio module low-frequency output adapted to output a low-frequency signal arriving in the radio module low-frequency input;
a digital radio decoder including a decoder high-frequency input, a decoder low frequency output connected to the radio module low frequency input, a digital radio receiver adapted to convert a digital radio signal arriving via the decoder high frequency input into a low frequency signal and to output the low frequency signal via the decoder low frequency output; and
a housing, the radio module and the digital radio decoder arranged in the housing.

2. The radio according to claim 1, wherein the radio module includes at least one radio module high-frequency input.

3. The radio according to claim 2, wherein the radio module includes an FM receiver adapted to receive an FM signal via the radio module high-frequency input and to output a low-frequency signal via the radio module low-frequency output.

4. The radio according to claim 2, wherein the radio module includes an AM receiver adapted to receive an AM signal via the radio module high-frequency input and to output a low-frequency signal via the radio module low-frequency output.

5. The radio according to claim 1, wherein the radio module low-frequency input and the decoder low-frequency output are directly connected to one another.

6. The radio according to claim 1, wherein the digital radio decoder is inserted into the housing.

7. The radio according to claim 1, wherein the decoder low-frequency output is soldered to the radio module low-frequency input.

8. The radio according to claim 1, wherein the decoder low-frequency output and the radio module low-frequency input form a plug connection.

9. The radio according to claim 1, wherein the radio module includes a radio module energy supply output adapted to a decoder energy supply input of the digital radio decoder.

10. The radio according to claim 1, wherein the radio module includes a radio module energy supply output connected to a decoder energy supply input of the digital radio decoder.

11. The radio according to claim 10, wherein the decoder energy supply input is soldered to the radio module energy supply output.

12. The radio according to claim 10, wherein the decoder energy supply input and the radio module energy supply output form a plug connection.

13. The radio according to claim 1, wherein the radio module includes a radio module control signal interface connected to a decoder control signal interface of the digital radio decoder.

14. The radio according to claim 13, wherein the decoder control signal interface is soldered to the radio module control signal interface.

15. The radio according to claim 13, wherein the decoder control signal interface and the radio module control signal interface form a plug connection.

16. The radio according to claim 1, wherein the radio module includes an interface with a CD drive.

17. The radio according to claim 1, wherein the radio module includes an interface with a telephone module.

18. The radio according to claim 1, wherein the radio module includes an interface with a TV tuner.

19. The radio according to claim 1, wherein the radio module includes a mounting plate.

20. The radio according to claim 19, wherein the radio module low-frequency input includes a plug connector on the mounting plate.

21. The radio according to claim 19, wherein a radio module energy supply output includes a plug connector on the mounting plate.

22. The radio according to claim 19, wherein a radio module control signal interface includes a plug connector on the mounting plate.

23. A method for producing a radio for a motor vehicle, comprising:

at least one of (a) placing in and (c) slipping into a housing a radio module including a radio module low-frequency input and a radio module low-frequency output adapted to output a low-frequency signal arriving in the radio module low-frequency input, and a digital radio decoder including a decoder high-frequency input, a decoder low-frequency output, and a digital radio receiver adapted to convert a digital radio signal arriving via the decoder high-frequency input into a low-frequency signal and to output the low-frequency signal via the decoder low-frequency output; and connecting the decoder low-frequency output to the radio module low-frequency input.

24. The method according to claim 23, wherein the decoder low-frequency output and the radio module low-frequency input are plugged together in the connecting step.

25. A method for producing a radio for a motor vehicle, comprising:

at least one of (a) arranging in and (b) inserting into a housing a radio module including a radio module low-frequency input and a radio module low-frequency output adapted to output a low-frequency signal arriving in the radio module low-frequency input, a radio module energy supply output, and a radio module control signal interface, and a digital radio decoder including a decoder high-frequency input, a decoder low-frequency output, a decoder energy supply input, a decoder control signal interface, and a digital radio receiver adapted to convert a digital radio signal arriving via the decoder high-frequency input into a low-frequency signal and to output the low-frequency signal via the decoder low-frequency output; and at least one of (a) connecting the decoder low-frequency output to the radio module low-frequency input, (b) connecting the decoder energy supply input to the radio module energy supply output and (c) connecting the decoder control signal interface to the radio module control signal interface.

* * * * *